(12) United States Patent
Zhang et al.

(10) Patent No.: US 11,988,930 B2
(45) Date of Patent: May 21, 2024

(54) STRIP-SHAPED DISPLAY STRUCTURE, DISPLAY PANEL AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Enliang Zhang, Beijing (CN); Jiakun Qi, Beijing (CN); Hanzhang Niu, Beijing (CN); Haijun Shi, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 204 days.

(21) Appl. No.: 17/621,783

(22) PCT Filed: Mar. 27, 2020

(86) PCT No.: PCT/CN2020/081726
§ 371 (c)(1),
(2) Date: Dec. 22, 2021

(87) PCT Pub. No.: WO2021/189433
PCT Pub. Date: Sep. 30, 2021

(65) Prior Publication Data
US 2022/0244605 A1 Aug. 4, 2022

(51) Int. Cl.
*G02F 1/1362* (2006.01)
*G02F 1/1333* (2006.01)
*G06F 1/16* (2006.01)

(52) U.S. Cl.
CPC .... *G02F 1/136286* (2013.01); *G02F 1/13336* (2013.01); *G06F 1/1641* (2013.01); *G06F 1/1656* (2013.01)

(58) Field of Classification Search
CPC ........... G02F 1/133351; G02F 1/13452; G02F 1/13336
See application file for complete search history.

(56) References Cited

U.S. PATENT DOCUMENTS

| | | | |
|---|---|---|---|
| 7,834,537 B2 | 11/2010 | Kee et al. | |
| 2018/0101036 A1* | 4/2018 | Wang | G02F 1/133345 |
| 2018/0173036 A1* | 6/2018 | Kim | G02F 1/133524 |

FOREIGN PATENT DOCUMENTS

| | | |
|---|---|---|
| CN | 102982744 A | 3/2013 |
| CN | 205177335 U | 4/2016 |

(Continued)

*Primary Examiner* — Jessica M Merlin
(74) *Attorney, Agent, or Firm* — Dilworth & Barrese, LLP.; Michael J. Musella, Esq.

(57) ABSTRACT

A strip-shaped display structure, a display panel and a display apparatus are provided. The strip-shaped main body part includes a strip-shaped display part, extending along a first direction and including a plurality of pixels arranged in an array and a driver circuit; the strip-shaped display part is at a first end part of the strip-shaped main body part; the extension part is connected to a second end part opposite to the first end part of the strip-shaped main body part, and is configured to be bendable from the second end part of the strip-shaped main body part along a bend axis parallel to the first direction to be away from a light exit side of the light emitting device of the pixels; the extension part includes a connection signal line; the connection signal line is connected to the driver circuit to provide a display signal to the driver circuit.

17 Claims, 8 Drawing Sheets

(56) References Cited

FOREIGN PATENT DOCUMENTS

| CN | 104123893 | B | | 6/2016 |
|---|---|---|---|---|
| CN | 106842711 | A | * | 6/2017 |
| CN | 106842711 | A | | 6/2017 |
| CN | 106991926 | A | | 7/2017 |
| CN | 111290154 | A | | 6/2020 |

* cited by examiner

STRIP-SHAPED DISPLAY STRUCTURE, DISPLAY PANEL AND DISPLAY APPARATUS

TECHNICAL FIELD

At least one embodiment of the present disclosure relates to a strip-shaped display structure, a display panel and a display apparatus.

BACKGROUND

The demand for large-size display screens, such as outdoor billboards, large-size TVs, etc., is increasing. Liquid crystal screens have characteristics of high brightness, high color saturation and high contrast, and have advantages of long service life and low cost, and have become increasingly popular in recent years. In the case where a large-size (for example, 110-inch or larger) display screen needs to be produced, the large-size display screen is usually obtained by splicing multiple small-size sub-display screens. The liquid crystal screens not only have the above performance advantages, but also are easy to be spliced, and therefore the solution of obtaining a large-size liquid crystal screen, using multiple small-size liquid crystal screens to be spliced, is widely used.

SUMMARY

At least one embodiment of the present disclosure provides a strip-shaped display structure, the strip-shaped display structure includes a main body part and an extension part, and the main body part includes a strip-shaped display part and a driver circuit. The strip-shaped display part extends along a first direction, the strip-shaped display part includes a plurality of pixels arranged in an array, each of the pixels includes a plurality of color sub-pixels, and each of the color sub-pixels includes a light emitting device; and the driver circuit is electrically connected to the light emitting device; the strip-shaped display part is at a first end part of the main body part, and the extension part is connected to a second end part opposite to the first end part of the main body part, and is configured to be bendable from the second end part of the main body part along a bend axis parallel to the first direction to be away from a light exit side of the light emitting device; and the extension part includes a connection signal line, and the connection signal line is connected to the driver circuit to provide a display signal to the driver circuit.

For example, in the strip-shaped display structure provided by at least one embodiment of the present disclosure, the main body part is a flat plate as a whole; in a direction from the first end part to the second end part of the main body part, a width of the strip-shaped display part is smaller than a width of the main body part; the main body part includes a foldable part extending along the first direction, the foldable part connects the strip-shaped display part and the extension part, and is configured to be bendable from a boundary of the foldable part and the strip-shaped display part along a bend axis parallel to the first direction to a light exit side of the strip-shaped display part away from the light emitting device, so as to be stacked with the strip-shaped display part.

For example, in the strip-shaped display structure provided by at least one embodiment of the present disclosure, the strip-shaped display part is stacked with the driver circuit, and the driver circuit is on a side of the strip-shaped display part away from the light exit side of the light emitting device.

For example, in the strip-shaped display structure provided by at least one embodiment of the present disclosure, the main body part includes a fold part connected with the strip-shaped display part, the fold part is bent along a bend axis parallel to the first direction to a side of the strip-shaped display part away from the light exit side of the light emitting device, and is stacked with the strip-shaped display part, and an end of the fold part opposite to an end connected to the strip-shaped display part is configured as the second end part of the main body part.

For example, the strip-shaped display structure provided by at least one embodiment of the present disclosure further includes a first reinforcement plate, and the first reinforcement plate is between the strip-shaped display part and the fold part, and is stacked with the strip-shaped display part and the fold part.

For example, in the strip-shaped display structure provided by at least one embodiment of the present disclosure, an orthographic projection of the second end part of the main body part, on a plane where the strip-shaped display part is located, is within the strip-shaped display part.

For example, in the strip-shaped display structure provided by at least one embodiment of the present disclosure, the fold part includes a plurality of sub-fold parts, the plurality of sub-fold parts are bent along a bend axis parallel to the first direction to a side of the strip-shaped display part away from the light exit side of the light emitting device and are stacked with the strip-shaped display part.

For example, the strip-shaped display structure provided by at least one embodiment of the present disclosure further includes a second reinforcement plate, and the second reinforcement plate is between adjacent sub-fold parts of the plurality of sub-fold parts, and is stacked with the strip-shaped display part and the plurality of sub-fold parts.

For example, in the strip-shaped display structure provided by at least one embodiment of the present disclosure, light emitting devices in the plurality of color sub-pixels in each pixel respectively emit light of different colors; each of the light emitting devices is a mini-LED and the distance between adjacent mini-LEDs in each pixel 1 is less than or equal to 250 μm; or, each of the light emitting devices is a micro-LED, and the distance between adjacent micro-LEDs in each pixel is less than or equal to 125 μm.

For example, in the strip-shaped display structure provided by at least one embodiment of the present disclosure, light emitting devices in the plurality of color sub-pixels in each of the plurality of pixels is taken as an encapsulation unit, the encapsulation unit is encapsulated separately with an encapsulation film.

For example, in the strip-shaped display structure provided by at least one embodiment of the present disclosure, the extension part includes a plurality of the connection signal lines, each of the plurality of pixels includes a first electrode and a second electrode, and the first electrode and the second electrode are respectively connected to a cathode and an anode of the light emitting device of each of the color sub-pixels in the each of the plurality of pixels; each of the plurality of pixels are in correspondence with two connection signal lines of the plurality of connection signal lines, and the two connection signal lines are respectively electrically connected to the first electrode and the second electrode in a pixel corresponding to the two connection signal lines.

For example, the strip-shaped display structure provided by at least one embodiment of the present disclosure further includes a flexible pin part, and the flexible pin part is at an end of the extension part, opposite to an end of the extension part connected to the main body part, and includes a plurality of pins, wherein the plurality of pins are electrically connected to the plurality of connection signal lines in one-to-one correspondence.

For example, the strip-shaped display structure provided by at least one embodiment of the present disclosure includes a plurality of the extension parts, the plurality of extension parts are arranged at intervals in the first direction, and each of the extension parts includes the connection signal line.

At least one embodiment of the present disclosure further provides a display panel, and the display panel includes a plurality of sub-display panels and any one of the strip-shaped display structures provided by the embodiments of the present disclosure. Each of the plurality of sub-display panels includes a plurality of main pixels arranged in an array, and each of the main pixels includes a plurality of color sub-pixels; the plurality of sub-display panels are spliced with each other, and a gap is between adjacent sub-display panels, the gap extends along the first direction, the main body part is stacked on a display side of the sub-display panel, and the strip-shaped display part covers the gap, the light emitting device is on a side of the main body part away from the sub-display panel, and the extension part is bent from the second end part of the main body part along a bend axis parallel to the first direction into the gap.

For example, in the display panel provided by at least one embodiment of the present disclosure, two adjacent sub-display panels of the plurality of sub-display panels are respectively a first sub-display panel and a second sub-display panel; the first sub-display panel includes a first display region and a first non-display region outside the first display region, and the second sub-display panel includes a second display region and a second non-display region outside the second display region, the first non-display region and the second non-display region are respectively on two sides of the gap; the strip-shaped display part covers the first non-display region and the second non-display region.

For example, in the display panel provided by at least one embodiment of the present disclosure, the main body part includes a first edge extending along the first direction and a second edge extending along the first direction, the first edge is opposite to the second edge; the first edge is aligned with an edge of the first display region, and the second edge is aligned with an edge of the second display region.

For example, in the display panel provided by at least one embodiment of the present disclosure, the first sub-display panel includes a plurality of first main pixels arranged in an array, and each of the first main pixels includes a plurality of color sub-pixels; the second sub-display panel includes a plurality of second main pixels arranged in an array, and each of the second main pixel units includes a plurality of color sub-pixels; a total number and colors of the plurality of color sub-pixels of each of the pixels of the strip-shaped display structure, a total number and colors of the plurality of color sub-pixels of each of the first main pixels, and a total number and colors of the plurality of color sub-pixels of each of the second main pixel are same, and an arrangement direction and an arrangement order of the plurality of color sub-pixels of each of the pixels of the display structure, an arrangement direction and an arrangement order of the plurality of color sub-pixels of each of the first main pixels, and an arrangement direction and an arrangement order of the plurality of color sub-pixels of each of the second main pixels are same.

For example, in the display panel provided by at least one embodiment of the present disclosure, the arrays of the main pixels of the plurality of sub-display panels are same, and a total number of the plurality of color sub-pixels of each of the main pixels is same, colors of the plurality of color sub-pixels of each of the main pixels is same, and an arrangement direction of the plurality of color sub-pixels of each of the main pixels is same; the gap includes a first gap and a second gap, an extension direction of the first gap is perpendicular to an extension direction of the second gap, and the strip-shaped display structure is respectively provided corresponding to the first gap and the second gap; an arrangement direction of the plurality of color sub-pixels of each of the pixels of the strip-shaped display structure corresponding to the first gap is perpendicular to an arrangement direction of the plurality of color sub-pixels of each of the pixels of the strip-shaped display structure corresponding to the second gap.

For example, in the display panel provided by at least one embodiment of the present disclosure, a plurality of the strip-shaped display structures are provided corresponding to one of the gap(s), and the plurality of strip-shaped display structures are arranged along the extension direction of the one of the gap(s), and no gap is between the main body parts of adjacent strip-shaped display structures.

For example, in the display panel provided by at least one embodiment of the present disclosure, the main body part is fixed to the sub-display panel by an adhesive glue, the main body part is in direct contact with the adhesive glue, and the adhesive glue is in direct contact with the sub-display panel.

For example, in the display panel provided by at least one embodiment of the present disclosure, a height difference, in a direction perpendicular to a surface of the display side of the sub-display panel, between a surface of the light exit side of the light emitting device of the first strip-shaped display structure and the surface of the display side of the sub-display panel is less than 1 mm.

For example, in the display panel provided by at least one embodiment of the present disclosure, in the case where the strip-shaped display structure includes a fold part and a first reinforcement plate and the display panel includes the adhesive glue, the first reinforcement plate includes a part that does not overlap with the fold part; the adhesive glue includes a first adhesive glue and a second adhesive glue. The first adhesive glue is between the part of the first reinforcement plate that does not overlap with the fold part and the sub-display panel, and the first adhesive glue is configured to fix the part of the first reinforcement plate that does not overlap with the fold part to the sub-display panel; and the second adhesive glue is between the fold part and the sub-display panel and is configured to fix the fold part on the sub-display panel; the thickness of the second adhesive glue in the direction perpendicular to the surface of the display side of the sub-display panel is greater than a thickness of the first adhesive glue in the direction perpendicular to the surface of the display side of the sub-display panel.

For example, in the display panel provided by at least one embodiment of the present disclosure, each of the plurality of sub-display panels includes a first substrate and a second substrate that are opposite to each other, and the first substrate is on a display side of the sub-display panel; each of the sub-display panels includes a side surface intersecting a surface of the display side of the sub-display panel and a back surface opposite to the display side, and at least a part of the extension part is attached to the side surface; the display panel further includes a display signal input circuit, the display signal input circuit is on a side of the second substrate away from the first substrate, and is configured to provide the display signal; and the connection signal line is electrically connected to the display signal input circuit.

For example, in the display panel provided by at least one embodiment of the present disclosure, each of the sub-display panels is a liquid crystal display panel, the first substrate is a color filter substrate, and the second substrate is an array substrate; the liquid crystal display panel further includes a backlight plate on a side of the array substrate away from the color filter substrate, the display signal input circuit is on a side of the backlight plate away from the array substrate, and the flexible pin part partly wraps a part of an edge of the backlight plate.

At least one embodiment of the present disclosure further provides a display apparatus, and the display apparatus includes any one of the display panels provided by the embodiments of the present disclosure.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

Figure 1A:
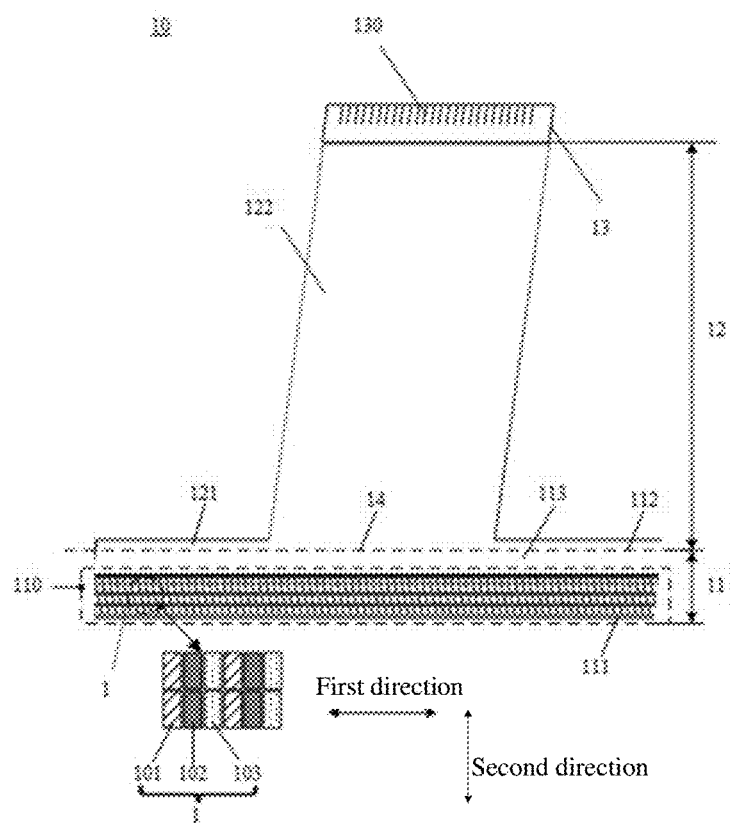
FIG. 1A is a schematic diagram of a strip-shaped display structure provided by an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "include/including," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "inside," "outside," "on," "under," or the like are only used to indicate relative position relationship, and in a case where the position of the object which is described is changed, the relative position relationship may be changed accordingly.

The drawings in the present disclosure are not drawn strictly to actual scale. The number of sub-display panels in the display panel, the number of pixels of the strip-shaped display structure, and the number of sub-pixels in each pixel are not limited to the drawings. The specific size and the number of each structure can be determined according to actual needs. The drawings described in the present disclosure are only schematic structural diagrams.

At least one embodiment of the present disclosure provides a strip-shaped display structure, the strip-shaped display structure includes a main body part and an extension part, the main body part includes: a strip-shaped display part extending along a first direction and a driver circuit. The strip-shaped display part includes a plurality of pixels arranged in an array, each of the pixels includes a plurality of color sub-pixels, and each of the color sub-pixels includes a light emitting device; the driver circuit is electrically connected to the light emitting device, the strip-shaped display part is at a first end part of the main body part, and the extension part is connected to a second end part, opposite to the first end part, of the main body part and is configured to be bendable from the main body part along a bend axis parallel to the first direction to be away from a light exit side of the light emitting device; and the extension part includes a connection signal line, and the connection signal line is connected to the driver circuit to provide a display signal to the driver circuit.

The strip-shaped display structure provided by the embodiments of the present disclosure can meet the demand for strip-shaped display. For example, in the case where a large-size (for example, 110-inch or larger) display panel needs to be manufactured, multiple small-size sub-display panels are usually used to be spliced with each other (joined together), to obtain the large-size display panel, but there is a seam (gap) between adjacent sub-display panels that is unavoidable in the manufacturing process, and the gap affects the display quality of the large-size display panel. In this case, the strip-shaped display structure provided by at least one embodiment of the present disclosure can be arranged in the display panel, the strip-shaped display part covers the above-mentioned gap, so that normal display can be realized at the position of the gap, and the display uniformity and display quality of the entire display panel are improved, seamless splicing is realized, and the display defect problem caused by the gap of the display panel obtained by splicing a plurality of sub-display panels can be solved. For example, the strip-shaped display structure provided by the embodiments of the present disclosure can be applied to a variety of fields and scenarios such as security monitoring of military command, mining safety, environmental monitoring and other systems, and information release of government corporate video conferences, airports, subways, shopping malls and hotels, and exhibitions in theaters, museums, stadiums, concerts, etc.

Illustratively, FIG. 1A is a schematic diagram of a strip-shaped display structure provided by an embodiment of the present disclosure. As shown in FIG. 1A, the strip-shaped display structure 10 provided by this embodiment includes a main body part 11 and an extension part 12. The main body part 11 includes a strip-shaped display part 110 extending in a first direction (as shown in FIG. 1A, that is, the extension direction of the strip-shaped display part 110) and a driver circuit. The strip-shaped display part 110 includes a plurality of pixels 1 arranged in an array, each pixel 1 includes a plurality of color sub-pixels 101/102/103, and each color sub-pixel 101/102/103 includes a light emitting device. The driver circuit is electrically connected to the light emitting device in each color sub-pixel 101/102/103 to provide the light emitting device with an electrical signal for controlling the light emitting state of the light emitting device. The strip-shaped display part 110 is at a first end part 111 of the main body part 11, and the extension part 12 is connected to a second end part 112, opposite to the first end part 111, of the main body part 11 and is configured to be bendable from the second end part 112 of the main body part 11 along a bend axis 14 parallel to the first direction to be away from a light exit side of the light emitting device. In addition, the extension part 12 includes a connection signal line, the connection signal line is connected to the driver circuit to provide a display signal to the driver circuit, so that the display signal is provided to the light emitting device in each color sub-pixel through the driver circuit to control the light emitting state of the light emitting device. The strip-shaped display structure provided by the embodiments of the present disclosure can meet the demand for a strip-shaped display region. For example, the strip-shaped display structure is provided in a large-size display panel obtained by splicing a plurality of small-size sub-display panels, the extension part 12 is bent from the second end part 112 of the main body part 11 along the bend axis 14 parallel to the first direction to be away from the light exit side of the light emitting device, so that the extension part 12 can be inserted into a gap between adjacent sub-display panels, in addition, the strip-shaped display part 110 is stacked on the light emitting surface of the display panel and covers the gap, so that normal display can be realized at the position of the gap, and the display uniformity and display quality of the entire display panel are improved, that is, seamless splicing is realized, and display defect problem caused by the gap of the display panel obtained by splicing a plurality sub-display panels can be solved.

For example, the main body part 11 includes a main board, and the driver circuit is provided in the main board. The main board includes a first surface, and the light emitting device is disposed on a first surface of the main board. The light exit side of the light emitting device refers to a side from which the light of the light emitting device is emitted out, that is, the side of the light emitting device away from the first surface of the main body part 11. For example, the main board includes a first part provided with pixels 1 and a second part not covered by the strip-shaped display part. For example, the main board is flexible.

For example, the strip-shaped display part 110 is stacked with the driver circuit, and the driver circuit is at a side of the strip-shaped display part 110 away from the light exit side of the light emitting device, and the light emitting device is located on the driver circuit and covers at least a part of the driver circuit.

For example, as shown in FIG. 1A, the main body part 11 is a flat plate as a whole. In a direction from the first end part 111 of the main body part 11 to the second end part 112 of the main body part 11 (that is, the second direction shown in FIG. 1A), the width of the strip-shaped display part 110 is smaller than the width of the main body part 11. For example, the main body part 11 includes a foldable part 113 extending in the first direction. The foldable part 113 connects the strip-shaped display part 110 and the extension part 12, and is configured to be bendable from a boundary of the foldable part 113 and the strip-shaped display part 110 along a bend axis parallel to the first direction to a back side of the strip-shaped display part away from the light emitting device, so as to be stacked with the strip-shaped display part. The foldable part 113 is the second part of the above-mentioned main board where the pixel 1 is arranged.

For example, a ratio of the length of the strip-shaped display part 110 in the first direction to the width of the strip-shaped display part 110 in the second direction (as shown in FIG. 1A) is greater than or equal to 25, and the second direction is perpendicular to the first direction. For example, the length of the strip-shaped display part 110 in the first direction is 100 mm, and the width of the strip-shaped display part 110 in the second direction is 4 mm. These sizes are only exemplary, and the specific length and width of the strip-shaped display part 110 are not limited by the embodiments of the present disclosure.

For example, in the embodiment shown in FIG. 1A, the planar shape of the extension part 12 is a T shape. As shown in FIG. 1A, the extension part 12 includes a first part 121 and a second part 122, and the first part 121 is connected with the second part 122. For example, the connection signal line is located in the first part 121 and the second part 122. For example, both the first part 121 and the second part 122 include shells, and the connection signal line is wrapped in the shells of the first part 121 and the second part 122 to be protected. For example, the shells of the first part 121 and the second part 122 are integrally formed. For example, the foldable part 113 of the main body part 11 also includes a shell, and at least a part of the driver circuit is wrapped in the shell of the foldable part 113; for example, the shells of the first part 121 and the second part 122 and the shell of the foldable part 113 are integral. The first part 121 is connected to the main body part 11 and has a strip shape extending in the first direction. For example, the length of the first part 121 in the first direction is equal to the length of the main body part 11 in the first direction. In this way, in the case that the extension part 12 is inserted into the gap of the above-mentioned display panel, for example, the entire first part 121 of the extension part 12 can be pasted on the side wall of the sub-display panel at one side of the gap, thereby enhancing stability of the fixation of the strip-shaped display structure on the display panel.

For example, the material of the shell is a flexible material, such as a soft material such as rubber, PVC and other organic materials.

Figure 1B:
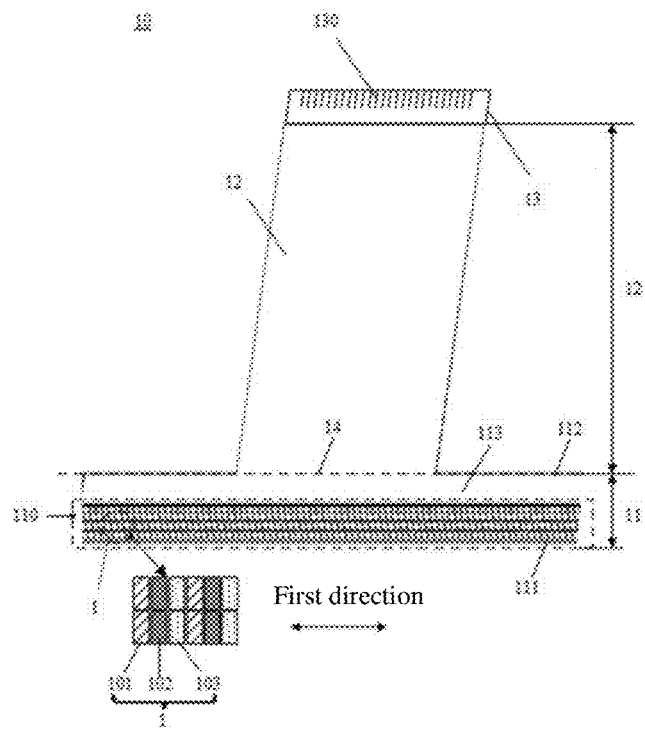
FIG. 1B is a schematic diagram of another strip-shaped display structure provided by an embodiment of the present disclosure.

For example, in the embodiment shown in FIG. 1B, the planar shape of the extension part 12 is a rectangle. The boundary between the extension part 12 and the main body part 11 is configured as the above-mentioned bend axis 14. The extension part 12 is configured to be bent from the second end part 112 of the main body part 11 along the bend axis 14 parallel to the first direction to be away from the light exit side of the light emitting device. For example, the length of the extension part 12 in the first direction is smaller than the length of the main body part 11 in the first direction. Other features of the embodiment shown in FIG. 1B are the same as those in FIG. 1A.

For example, light emitting devices in the plurality of color sub-pixels 101/102/103 in each pixel 1 respectively emit light of different colors. For example, each color sub-pixel 101/102/103 is provided with one light emitting device. For example, in some embodiments, the length of one pixel 1 along the arrangement direction of the plurality of color sub-pixels 101/102/103 ranges from 540 μm to 560 μm, each of the light emitting devices is a mini-LED and the distance between adjacent mini-LEDs in each pixel 1 is less than or equal to 250 μm; or, in other embodiments, the length of a pixel 1 along the arrangement direction of the plurality of color sub-pixels 101/102/103 ranges from 270 μm to 280 μm, each of the light emitting devices is a micro-LED, and the distance between adjacent micro-LEDs in each pixel 1 is less than or equal to 125 μm. Adopting the mini-LED or the micro-LED as the light emitting device can reduce the distance between adjacent light emitting devices, so as to better match the sub-pixel size of the sub-display panel in the display panel obtained by splicing. For example, the display panel is an LCD display panel, of course, the display panel may also be other types of display panels.

For example, in the strip-shaped display structure provided by the present disclosure, the light emitting devices in the plurality of color sub-pixels 101/102/103 in each pixel 1 are taken as an encapsulation unit, and each encapsulation unit is independently encapsulated with an encapsulation film. In this way, each encapsulation unit can be flexibly arranged to meet the size requirement of the display region of the strip-shaped display structure 10, so as to more accurately cover the above-mentioned gap of the spliced display panel and the non-display region surrounding the gap. In addition, the encapsulation film includes no optical glass layer, and therefore no light reflection occurs. Compared with other solutions to the problem of display defects caused by the gap of the spliced display panel, the strip-shaped display structure provided by the embodiments of the present disclosure has a simple structure, which makes the display effect of the sub-display panel and the vicinity of the gap more consistent, and no gap can be seen in all viewing angles. For example, the surface of the display panel obtained by splicing the sub-panels is covered with a piece of special optical glass, and edges of the optical glass are beveled so that the edges of the optical glass are spliced into a triangular structure, and the blind area caused by the refraction of light makes the black gap be weakened at a certain angle during the display process, but the optical glass is convex, which causes serious reflection on the large screen; the gap is not tightly covered by the optical glass, and dust may be absorbed in the case of static electricity; moreover, under conditions of certain color, certain brightness, certain viewing angle, etc., the gap will appear. However, in the case that the strip-shaped display structure provided by at least one the embodiment of the present disclosure is applied to the display panel, these problems do not exist.

For example, the extension part 12 includes a plurality of the connection signal lines. Each pixel 1 of the plurality of pixels 1 includes a first electrode and a second electrode, and the first electrode and the second electrode are respectively electrically connected to the cathode and the anode of the light emitting device of each color sub-pixel 101/102/103 in the pixel 1, each pixel 1 of the plurality of pixels 1 corresponds to two connection signal lines of the plurality of connection signal lines, and the two connection signal lines are respectively electrically connected to the first electrode and the second electrode in the corresponding pixel 1. In this way, there is no need to connect a plurality of connection signal lines directly to each color sub-pixel 101/102/103, thereby reducing the number of the connection signal lines, simplifying the structure of the strip-shaped display structure, and reducing the space reserved for setting more connection signal lines, for example, reducing the size of the extension part 12.

Figure 1C:
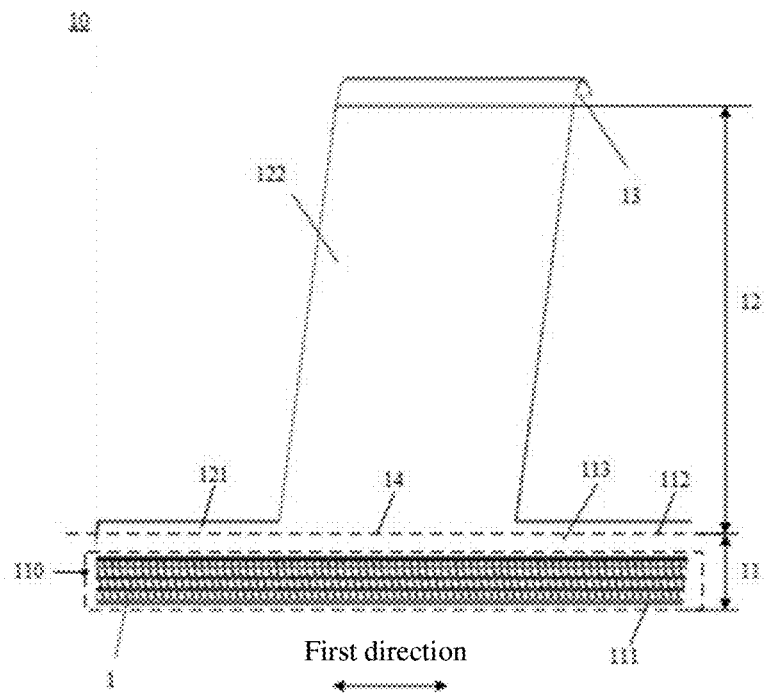
FIG. 1C is a schematic diagram of a flexible pin part of the strip-shaped display structure in FIG. 1A in a bent state.

For example, the strip-shaped display structure 10 further includes a flexible pin part 13, the flexible pin part 13 is located at an end of the extension part 12, opposite to an end of the extension part 12 that is connected to the main body part 11, and the flexible pin part 13 includes a plurality of pins 121. The plurality of pins 121 are electrically connected to the plurality of connection signal lines in one-to-one correspondence. The plurality of pins 121 are configured to connect with a display signal input circuit in the display panel, so as to provide the display signal from the display signal input circuit to the driver circuit, so that the display signal is provided to the light emitting device of each color sub-pixel 101/102/103 through the driver circuit. FIG. 1C is a schematic diagram of the flexible pin part 13 of the strip-shaped display structure in FIG. 1A in a bent state. As shown in FIG. 1C, the flexible pin part 13 can be bent to better adapt to the position of the display signal input circuit. For example, for a space-saving and reasonable design, the display signal input circuit is arranged on the back side of the sub-display panel opposite to the display side. In this case, the flexible pin part 13 can be bent to the state shown in FIG. 1C to be able to connect with the display signal input circuit.

Figure 1D:
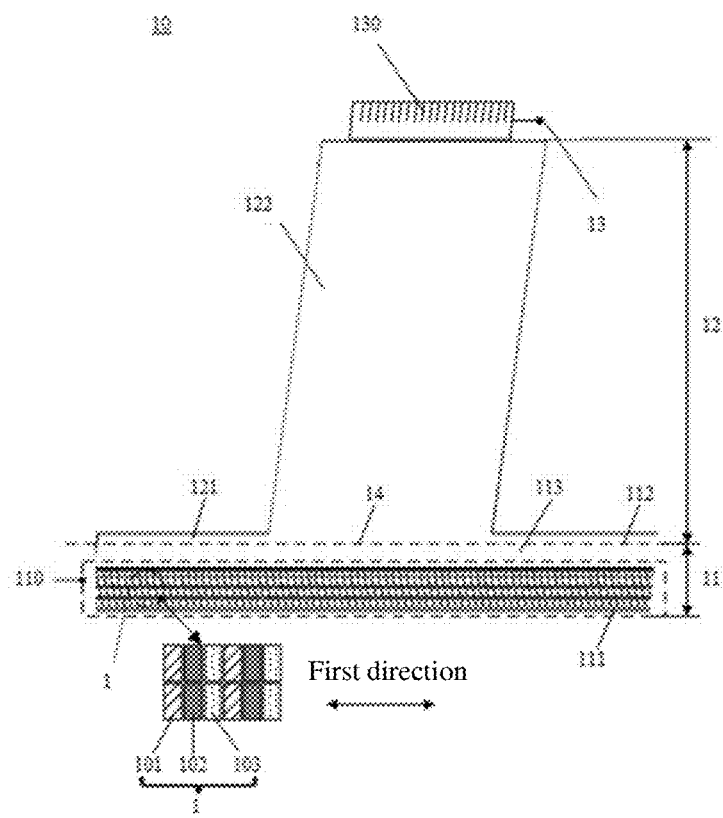
FIG. 1D is a schematic diagram of another strip-shaped display structure provided by an embodiment of the present disclosure.

For example, in the embodiment shown in FIG. 1A, the length of the flexible pin part 13 in the first direction is substantially equal to the length of the extension part 12 in the first direction. For example, in other embodiments, the length of the flexible pin part 13 in the first direction is smaller than the length of the extension part 12 in the first direction, as shown in FIG. 1D. The flexible pin part 13 with a smaller width facilitates its bending so as to be connected to the display signal input circuit. Other features and technical effects of the embodiment shown in FIG. 1D are the same as those of the embodiment shown in FIG. 1A, please refer to the descriptions of the embodiment shown in FIG. 1A.

Figure 2:
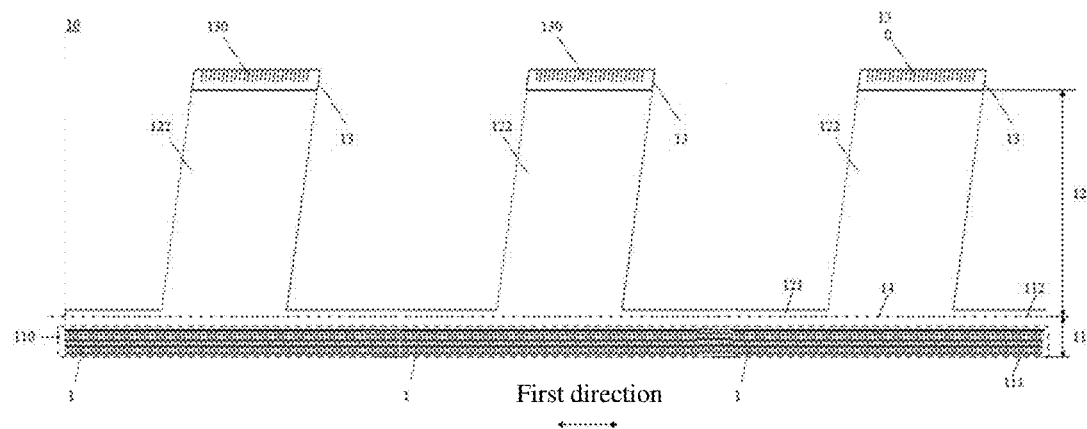
FIG. 2 is a schematic diagram of another strip-shaped display structure provided by an embodiment of the present disclosure.

FIG. 2 is a schematic diagram of another strip-shaped display structure provided by an embodiment of the present disclosure. For example, in the embodiment shown in FIG. 2, the strip-shaped display structure 10 includes a plurality of the extension parts 12, the plurality of extension parts 12 are arranged at intervals in the first direction, and each extension part 12 includes the connection signal line and the flexible pin part 13 to which the connection signal line is connected. The strip-shaped display structure 10 may have a larger length in the first direction, which can meet the requirement of covering a longer gap in the display panel, that is, the gap is covered by a strip-shaped display part with a larger length and without splicing, and there is no need to splice a plurality of strip-shaped display structures 10 each of which is with a smaller length d to cover a longer gap, so as to further improve the display effect at the gap, and simplify the assembly process of the display panel adopting the strip-shaped display structure 10. The features of each extension part 12 and other features of the embodiment illustrated in FIG. 2 and technical effects thereof are the same as those in the previous embodiments, please refer to the previous descriptions.

Figure 3:
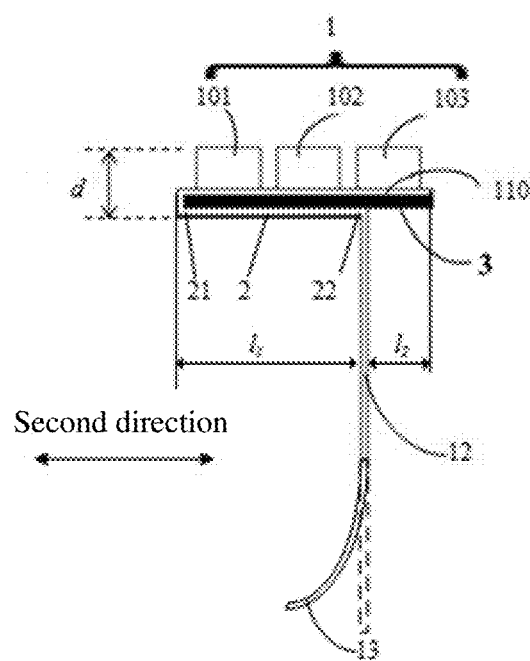
FIG. 3 is a schematic diagram of further another strip-shaped display structure provided by an embodiment of the present disclosure.

FIG. 3 is a schematic diagram of another strip-shaped display structure provided by an embodiment of the present disclosure. The strip-shaped display structure 10 shown in FIG. 3 has the following differences from the embodiment shown in FIG. 1A. As shown in FIG. 3, the main body part 11 includes a fold part 2 connected to the strip-shaped display part 110, and the fold part 2 is bent along a bend axis parallel to the first direction onto a side of the strip-shaped display part 110 away from the light exit side of the light emitting device, and is stacked with the strip-shaped display part 110; the end 22 of the fold part 2 opposite to the end 21 connected to the strip-shaped display part 110 is configured as the second end part of the main body part 11. That is, the foldable part 113 of the strip-shaped display structure 10 shown in FIG. 1A is able to be bent from the boundary of the foldable part 113 and the strip-shaped display part 110 along a bend axis parallel to the first direction to a back side of the strip-shaped display part 110 away from the light emitting device, so as to be stacked with the strip-shaped display part 110 to become the fold part 2 in FIG. 3. For example, the extension part 12 is bent from the second end part 22 of the main body part 11 along a bend axis parallel to the first direction to be away from the light exit side of the light emitting device. For example, a projection of the second end part 22 of the main body part 11 on a plane where the strip-shaped display part 110 is located is within the strip-shaped display part 110. Thus, in this way, in the case where the strip-shaped display structure 10 is installed in the display panel, the extension part 12 can be inserted into the gap between adjacent sub-display panels, and the strip-shaped display part 110 is stacked with the light-emitting surface of the display panel and covers the gap and at least a part of the non-display regions of the adjacent sub-display panels on both two sides of the gap, so that the display effect at the gap and at least a part of the non-display regions of the adjacent sub-display panels on the both two sides of the gap is better.

For example, the length $l_1$ of the orthographic projection of the fold part 2 on the plane where the strip-shaped display part 110 is located in the second direction is equal to half of the width of the strip-shaped display part 110 in the second direction, that is, $l_1=l_2$; or, the length $l_1$ of the orthographic projection of the fold part 2 on the plane where the strip-shaped display part 110 is located in the second direction is greater than half of the width of the strip-shaped display part 110 in the second direction, that is, $l_1>l_2$; or, the length $l_1$ of the orthographic projection of the fold part 2 on the plane where the strip-shaped display part 110 is located in the second direction is less than half of the width of the strip-shaped display part 110 in the second direction, that is, $l_1<l_2$. It may be designed according to actual needs, for example, according to the width in the second direction of the non-display region that needs to be covered by the fold part 2 in the display panel obtained by splicing.

For example, as shown in FIG. 3, the strip-shaped display structure 10 further includes a first reinforcement plate 3. The first reinforcement plate 3 is located between the strip-shaped display part 110 and the fold part 2, and is stacked with the strip-shaped display part 110 and the fold part 2. The first reinforcement plate 3 can increase the strength of the stacked structure formed by the strip-shaped display part 110 and the fold part 2. For example, the reinforcement plate is made of a metal material (such as a metal or an alloy, such as copper, aluminum, copper alloys, etc.) or a non-metallic material (an organic material such as a resin-based material, an inorganic material such as silicon dioxide, silicon nitride, or silicon oxide light, etc.).

As shown in FIG. 3, the flexible pin part 13 is sheet-shaped and is not bent, as shown by the dashed line in the figure; or, the flexible pin part 13 is bent and is bent toward the left side of the extension part 12 in the figure. In other embodiments, the flexible pin part 13 may be bent toward the right side of the extension part 12 in the figure, for example, it is determined according to the position of the display signal input circuit needed to be connected to the flexible pin part 13. Other features of the embodiment shown in FIG. 3 are the same as those in FIG. 1A.

Figure 4:
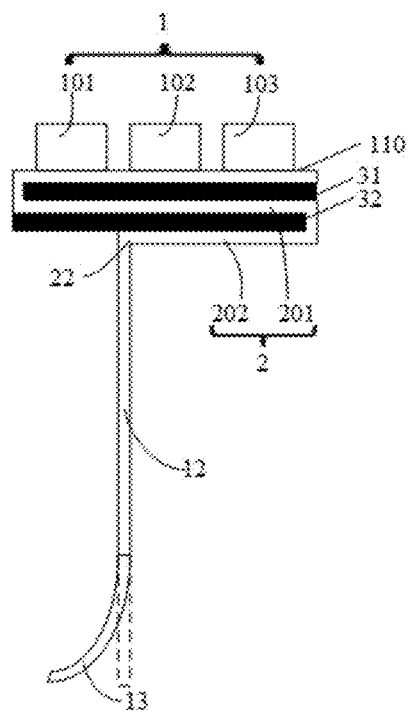
FIG. 4 is a schematic diagram of further another strip-shaped display structure provided by an embodiment of the present disclosure.

FIG. 4 is a schematic diagram of further another strip-shaped display structure provided by an embodiment of the present disclosure. The strip-shaped display structure 10 shown in FIG. 4 has the following differences from the embodiment shown in FIG. 3. As shown in FIG. 4, the fold part 2 includes a plurality of sub-fold parts, and the plurality of sub-fold parts are bent along a bend axis parallel to the first direction to a side of the strip-shaped display part 110 away from the light exit side of the light emitting device and are stacked with the strip-shaped display part 110. For example, in this embodiment, the fold part 2 including a first sub-fold part 201 and a second sub-fold part 202 is taken as an example, but the fold part 2 is not limited to this example which includes two fold parts. In other embodiments, the fold part 2 may also include three or more fold parts. The first sub-fold part 201 has a first end and a second end in the second direction, and the first end of the first sub-fold part 201 is connected to the first end of the strip-shaped display part 110. The second sub-fold part 202 has a first end and a second end 22 in the second direction, the first end of the second sub-fold part 202 is connected to the second end of the first sub-fold part 201, and the second end of the second sub-fold part 202 is connected to the extension part 12; and the second end 22 of the second sub-fold part 202 serves as the second end part of the main body part 11.

For example, the strip-shaped display structure further includes a second reinforcement plate, the second reinforcement plate is located between adjacent sub-fold parts and is stacked with the strip-shaped display part and the plurality of sub-fold parts. For example, as shown in FIG. 4, the strip-shaped display structure 10 includes a first reinforcement plate 31 and a second reinforcement plate 32. The first reinforcement plate 31 is located between the strip-shaped display part 110 and the first sub-fold part 201, and is stacked with the strip-shaped display part 110 and the first sub-fold part 201; the second reinforcement plate 32 is located between the first sub-fold part 201 and the second sub-fold part 202, and is stacked with the strip-shaped display part 110, the first sub-fold part 201, and the second sub-fold part 202, to further increase the strength of the stacked structure formed by the strip-shaped display part 110 and the fold part 2. The material of the second reinforcement plate 32 is the same as the material of the first reinforcement plate in the embodiment shown in FIG. 3, which is not be repeated here.

At least one embodiment of the present disclosure further provides a display panel, the display panel includes a plurality of sub-display panels and the strip-shaped display structure provided by the embodiments of the present disclosure. Each of the plurality of sub-display panels includes a plurality of main pixels arranged in an array, and each of the main pixels includes a plurality of color sub-pixels; the plurality of sub-display panels are spliced with each other, and a gap is between adjacent sub-display panels, the gap extends along the first direction, the main body part is stacked on a display side of the sub-display panel and covers the gap, the light emitting device is on a side of the main body part away from the sub-display panel, and the extension part extends is bent from the second end part of the main body part along a bend axis parallel to the first direction into the gap.

Figure 5:
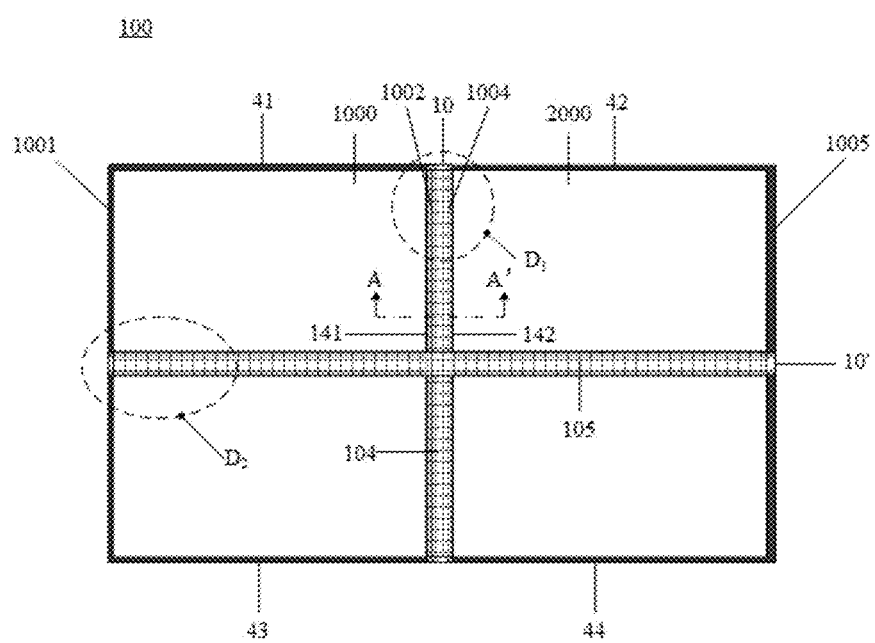
FIG. 5 is a plane schematic diagram of a display panel provided by an embodiment of the present disclosure.
Figure 6:
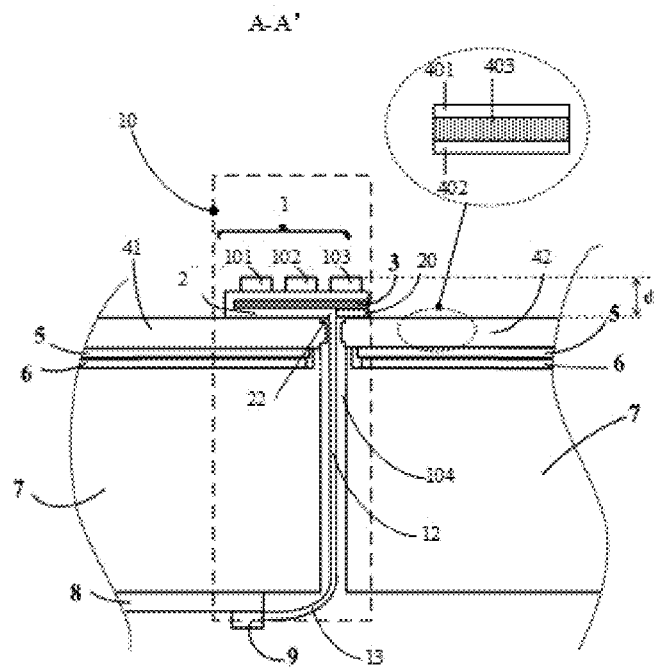
FIG. 6 is a cross-sectional diagram taken along the line A-A' in FIG. 5.
Figure 7A:
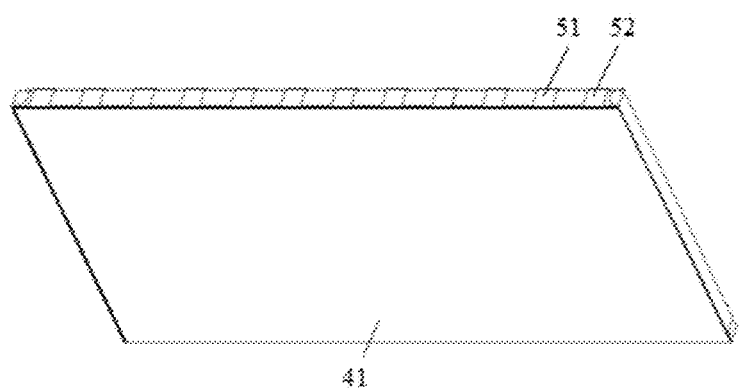
FIG. 7A is a schematic diagram of a sub-display panel with a strip-shaped display structure of a display pane, provided by an embodiment of the present disclosure.
Figure 7B:
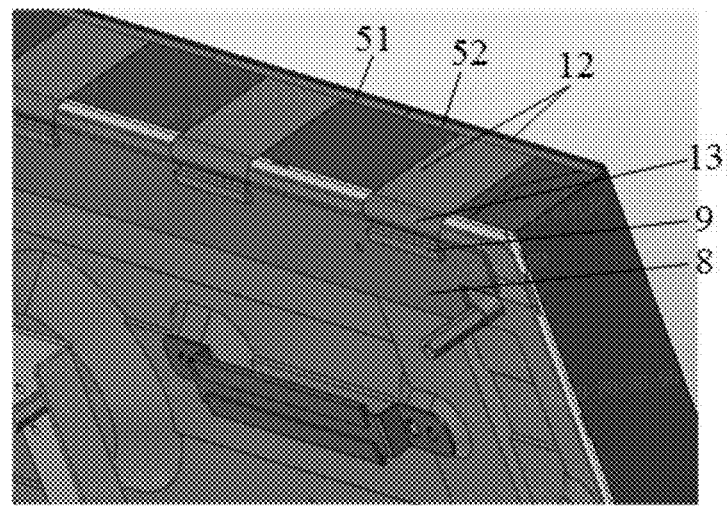
FIG. 7B is a partial enlarged diagram of the sub-display panel shown in FIG. 7A.

Illustratively, FIG. 5 is a plane schematic diagram of a display panel provided by an embodiment of the present disclosure; FIG. 6 is a cross-sectional diagram along a line A-A' in FIG. 5; FIG. 7A is a schematic diagram of a display panel, provided by an embodiment of the present disclosure, provided with a strip-shaped display structure provided by an embodiment of the present disclosure; and FIG. 7B is a partial enlarged diagram of the sub-display panel shown in FIG. 7A. With reference to FIGS. 5, 6 and 7A-7B, the display panel 100 includes a plurality of sub-display panels such as a first sub-display panel 41, a second sub-display panel 42, a third sub-display panel 43, and a fourth sub-display panel 44, and includes the strip-shaped display structure provided by the embodiments of the present disclosure such as a first strip-shaped display structure 10 and a second strip-shaped display structure 10'. In this embodiment, the case that each one of the first strip-shaped display structure 10 and the second strip-shaped display structure 10' is the strip-shaped display structure shown in FIG. 3 is taken as an example. The first strip-shaped display structure 10 and the second strip-shaped display structure 10' in the display panel 100 provided in this embodiment may also be the strip-shaped display structure shown in FIG. 1A, that is, in the process of installing the strip-shaped display structure shown in FIG. 1A to the display panel 100, the foldable part 113 in FIG. 1A is bent from the boundary of the foldable part 113 and the strip-shaped display part 110 along the bend axis parallel to the first direction to a back surface of the strip-shaped display part 110 away from the light emitting device to be stacked with the strip-shaped display part 110 to become the fold part 2 in FIG. 6, and the extension part 12 in FIG. 3 is bent from the second end part 112 of the main body part 11 along the bend axis 14 parallel to the first direction to be away from the light exit side of the light emitting device, and the bent extension part 12 is inserted into the gap between adjacent sub-display panels to obtain the display panel 100 shown in FIG. 6.

For example, the first sub-display panel 41, the second sub-display panel 42, the third sub-display panel 43, and the fourth sub-display panel 44 are spliced (joined together) to obtain the display panel 100, and there are gaps between any adjacent two sub-display panels. Each gap extends along the above-mentioned first direction, that is, the direction of each gap is the same as the extension direction of the corresponding strip-shaped display structure 10. For example, in the embodiment shown in FIG. 5, the display panel 100 has a gap that is cross-shaped as a whole. That is, the gap includes a first gap and a second gap, the extension direction of the first gap is perpendicular to the extension direction of the second gap, and the above-mentioned display structures are respectively provided corresponding to the first gap and the second gap. The cross-shaped gap includes a first gap 104 and a second gap 105 respectively extending in two directions perpendicular to each other, and the first gap 104 intersect the second gap 105. The main body part of the first strip-shaped display structure 10 and the main body part of the second strip-shaped display structure 10' are stacked on the display side of the sub-display panels 41/42/43/44. The first strip-shaped display structure 10 covers the first gap 104, and the second strip-shaped display structure 10' covers the second gap 105. That is, the gap includes a first gap and a second gap, the extension direction of the first gap is perpendicular to the extension direction of the second gap, and the above-mentioned display structures are respectively provided corresponding to the first gap and the second gap. The light emitting devices (in the plurality of color sub-pixels 101/102/103) are located on a side of the main body part of the first strip-shaped display structure 10 away from the sub-display panels 41/42/43/44 and on a side of the main body part of the second strip-shaped display structure 10' away from the sub-display panels 41/42/43/44. The extension part 12 is bent from the second end part of the main body part along a bend axis parallel to the first direction into the gap. Each sub-display panel 41/42/43/44 of the plurality of sub-display panels includes a plurality of main pixels arranged in an array, and each main pixel of the plurality of main pixels includes a plurality of color sub-pixels. In this way, display images of the first strip-shaped display structure 10 and the second strip-shaped display structure 10' can be controlled to be combined with display images of the plurality of sub-display panels 41/42/43/44, so that normal display can be realized at positions of the first gap 104 and the second gap 105, which can improve the display uniformity and display quality of the entire display panel 100, realize seamless splicing, and solve the display defect problem caused by the gap of the display panel obtained by splicing a plurality of sub-display panels.

It should be noted that the display side of the display panel refers to the side on which the light of the display panel exits. For example, in FIG. 6, the display side is the side of the display panel 100 where the plurality of color sub-pixels 101/102/103 are arranged. The light emitted by the light emitting devices in the plurality of color sub-pixels 101/102/103 and the light emitted by the light emitting devices in the main pixels in the plurality of sub-display panels 41/42/43/44 are emitted out from the display side of the display panel 100.

For example, two adjacent sub-display panels are respectively a first sub-display panel and a second sub-display panel, and the first sub-display panel 41 and the second sub-display panel 42 are taken as an example. The first sub-display panel 41 includes a first display region 1000 and a first non-display region outside the first display region 1000. The first non-display region includes a first region 1001 away from the first gap 104 and a second region 1002 opposite to the first region 1001. The second sub-display panel 42 includes a second display region 2000 and a second non-display region outside the second display region 2000, the second non-display region includes a second region 1005 away from the first gap 104 and a first region 1004 opposite to the second region 1005. The second region 1002 of the first non-display region and the first region 1004 of the second non-display region are respectively located on two sides of the first gap 104. The strip-shaped display part of the first strip-shaped display structure 10 covers at least a part of the second region 1002 of the first non-display region and at least a part of the first region 1004 of the second non-display region. For example, the strip-shaped display part 110 of the first strip-shaped display structure 10 covers at least a part of the second region 1002 of the first non-display region and at least a part of the first region 1004 of the second non-display region, so that the non-display regions on both sides of the first gap 104 also has a better display effect, which compensates for the lack of display at the first gap 104 and at the non-display regions on both two sides of the first gap 104, and improves the display uniformity of the entire display panel 100, thereby improving the overall display quality of the display panel 100.

For example, the first strip-shaped display structure 10 covers the entire second region 1002 of the first non-display region and the entire first region 1004 of the second non-display region. That is, the main body part of the first strip-shaped display structure 10 includes a first edge 141 extending in the first direction and a second edge 142 extending in the first direction, the first edge 141 is opposite to the second edge 142; the first edge 141 is aligned with the edge of the first display region 100 close to the first gap 104, and the second edge 142 is aligned with the edge of the second display region 2000 close to the first gap 104. Therefore, the seamless splicing of the first sub-display panel 41 and the second sub-display panel 42 is realized to obtain a better display effect. For example, in some other embodiments, because of the manufacturing process of the display panel, the strip-shaped display part of the first strip-shaped display structure 10 covers at least one of the edge of the first display region 1000 and the edge of the second display region 2000, this solution can also achieve similar technical effects to the embodiment shown in FIG. 5.

Referring to FIGS. 7A-7B, for example, in the display panel provided by some embodiments, a plurality of strip-shaped display structures 51/52 are provided corresponding to one gap, and the plurality of strip-shaped display structures 51/52 extend along the gap. No interval (no gap) is between the first main body parts of adjacent strip-shaped display structures 51/52, so as to form a continuously distributed strip-shaped display part covering the gap to obtain a better display effect.

Of course, in other embodiments, the first strip-shaped display structure 10 covering one gap, such as the first gap 104 shown in FIG. 5, is one strip-shaped display structure shown in FIG. 2 instead of a plurality of strip-shaped display structures distributed continuously, the one first strip-shaped display structure 10 includes a plurality of extension parts 12 arranged at intervals in the first direction (that is, the extension direction of the strip-shaped display structure), and each extension part 12 includes the connection signal line and the flexible pin part 13 connected to the connection signal line. The first strip-shaped display structure 10 may have a larger length in the first direction to meet the requirement of covering a longer gap in the display panel, that is, the first gap 104 is formed by a strip-shaped display part with a larger length without splicing, and it is not necessary to adopt a plurality of strip-shaped display structures 10 each of which is with a smaller length to cover the longer gap, so as to further improve the display effect at the gap.

For example, as shown in FIG. 6, the main body part of the first strip-shaped display structure 10 is fixed to the display panel 100 by an adhesive glue, and the main body part is in direct contact with the adhesive glue, and the adhesive glue is in contact with the surface on the display side of the first sub-display panel 41 and the surface on the display side of the second sub-display panel 42. That is, there is no structure other than the adhesive glue between the back surface of the main body part close to the display panel 100 and the surface of the display side of the display panel, thereby reducing level difference between the surface of the display side of the first strip-shaped display structure 10 and the surface of the display side of the sub-display panel. For example, a height difference d between the surface of the light exit side of the light emitting device of the first strip-shaped display structure 10 (that is, the display side of the first strip-shaped display structure 10) and the surface of the display side of the first sub-display panel 41 in the direction perpendicular to the surface of the display side of the first sub-display panel 41 is less than 1 mm, that is, the height of the part of the main body part of the first strip-shaped display structure 10 protruding from the sub-display panel 41/42/43/44 is less than 1 mm. Tests on actual products show that the height difference d has a very large influence on the difference in image tone, etc. Therefore, reducing the height difference d has an important effect on obtaining a good display effect. Moreover, the first strip-shaped display structure 10 can be closely attached to the sub-display panel 41/42/43/44, and the first gap 104 can be covered tightly, and dust cannot be absorbed in the first gap 104.

The above embodiments only take the structural relationship of the adjacent sub-first sub-display panel 41 and the second sub-display panel 42, the gap between the adjacent sub-first sub-display panel 41 and the second sub-display panel 42 and the first strip-shaped display structure 10 covering the gap as an example to illustrate the position of the strip-shaped display structure in the display panel, and this is true for any adjacent sub-display panels and the gap between them.

For example, as shown in FIG. 6, the first reinforcement plate 3 includes a part that does not overlap with the fold part 2. The adhesive glue includes a first adhesive glue 20 and a second adhesive glue (not shown in the figure). The first adhesive glue 20 is located between the part of the first reinforcement plate 3 that does not overlap with the fold part 2 and the second sub-display panel 42 and is configured to fix the part of the first reinforcement board 3 that does not overlap with the fold part 2 to the second sub-display panel 42; the second adhesive glue is located between the fold part 2 and the second sub-display panel 42 and is configured to fix the fold part 2 to the second sub-display panel 42. The thickness of the first adhesive glue 20 in the direction perpendicular to the surface of the display side of the second sub-display panel 42 is greater than the thickness of the second adhesive glue in the direction perpendicular to the surface of the display side of the second sub-display panel 42, so as to keep the surface of the main body part of the first strip-shaped display structure 10 away from the sub-display panel 41/42/43/44 horizontal, for example, parallel to the surface of the display side of the sub-display panel 41/42/43/44.

Figure 8A:
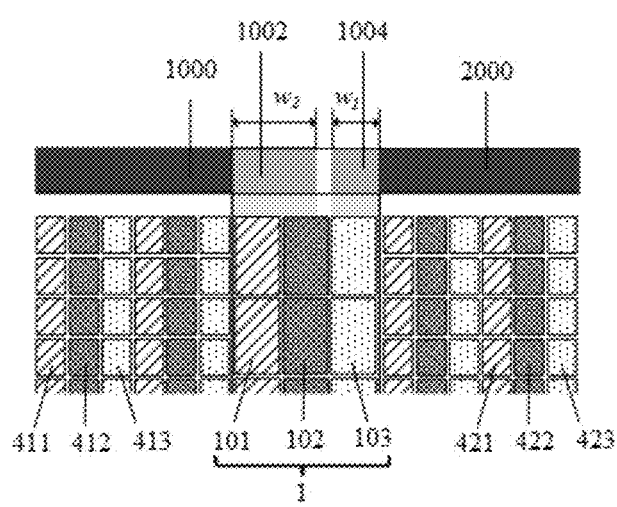
FIG. 8A is an enlarged diagram of a partial region $D_1$ in FIG. 5.
Figure 8B:
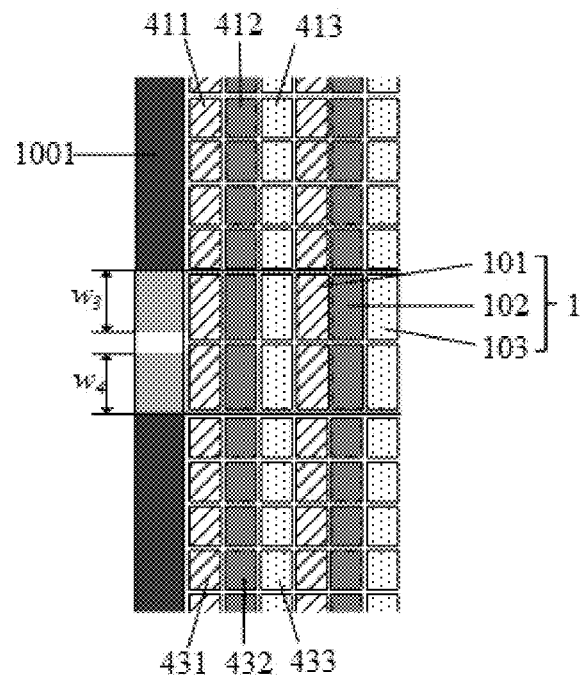
FIG. 8B is an enlarged diagram of a partial region $D_2$ in FIG. 5.

FIG. 8A is an enlarged diagram of a partial region $D_1$ in FIG. 5; and FIG. 8B is an enlarged diagram of a partial region $D_2$ in FIG. 5. As shown in FIG. 8A, for example, the width $w_2$ of the second region 1002 of the first non-display region in the second direction is different from the width $w_1$ of the first region 1004 of the first non-display region in the second direction. Generally, each sub-display panel is provided with a separate display driver circuit. In order to achieve a narrow frame as much as possible, for the first sub-display panel 41, the display driver circuit is disposed in the second region 1002 of the first non-display region with a larger width instead of in the first region 1001 opposite to the second region 1002 of the first non-display region, similarly, for the second sub-display panel 42, the display driver circuit is disposed in the second region 1005 of the second non-display region with a wider width instead of in the first region 1004 opposite to the second region 1005 of the second non-display region.

Or, in other embodiments, the width $w_2$ of the second region 1002 of the first non-display region in the second direction is the same as the width $w_1$ of the first region 1004 of the first non-display region in the second direction.

Similarly, for adjacent first sub-display panel 41 and third sub-display panel 43, as shown in FIG. 8B, the width $w_3$ of the non-display region of the first sub-panel 41 covered by the second strip-shaped display structure 10' is the same as or different from the width $w_4$ of the non-display region of the third sub-panel 43 covered by the second strip-shaped display structure 10'.

Combining FIG. 5 and FIG. 8A, for example, the first sub-display panel 41 includes a plurality of first main pixels arranged in an array, and each first main pixel includes a plurality of color sub-pixels 411/412/413; the second sub-display panel 42 includes a plurality of second main pixels arranged in an array, and each second main pixel unit includes a plurality of color sub-pixels 421/422/423; the number and colors of the plurality of color sub-pixels 101/102/103 in each pixel 1 of the first strip-shaped display structure 10, the number and colors of the plurality of color sub-pixels 411/412/413 in each first main pixel, and the number and colors of the plurality of color sub-pixels 421/422/423 in each second main pixel are respectively the same, in addition, the arrangement direction and arrangement order of the plurality of color sub-pixels 101/102/103 in each pixel of the first strip-shaped display structure 10, the arrangement direction and arrangement order of the plurality of color sub-pixels 411/412/413 in each first main pixel, and the arrangement direction and arrangement order of the plurality of color sub-pixels 421/422/423 in each second main pixel are respectively the same. In this way, in the entire display region of the display panel 100, the colors and arrangement order of all the color sub-pixels are the same, and therefore a more uniform display effect is obtained. That is, for example, the plurality of color sub-pixels 101/102/103 respectively emit red light, green light and blue light, and are arranged in order from left to right; the plurality of color sub-pixels 411/412/413 respectively emit red light, green light and blue light, and are arranged in order from left to right; and the plurality of color sub-pixels 421/422/423 respectively emit red, green and blue light, which are arranged in order from left to right. At the boundary of the first sub-display panel 41 and the first strip-shaped display structure 10, the sub-pixel of the first sub-display panel 41 closest to the first strip-shaped display structure 10 is the sub-pixel 413 emitting blue light, and the sub-pixel of the first strip-shaped display structure 10 that is adjacent to the sub-pixel 413 emitting blue light is the sub-pixel 101 emitting red light; at the boundary of the second sub-display panel 42 and the first strip-shaped display structure 10, the sub-pixel of the second sub-display panel 42 closest to the first strip-shaped display structure 10 is the sub-pixel 421 emitting red light, and the sub-pixel of the strip-shaped display structure 10 that is adjacent to the sub-pixel 421 emitting red light is the sub-pixel 103 emitting blue light. In this way, the display effect at the boundary of the first sub-display panel 41 and the first strip-shaped display structure 10 and at the boundary of the second sub-display panel 42 and the first strip-shaped display structure 10 has a high degree of consistency with the display effect of the first sub-display panel 41 and the second sub-display panel 42, and the entire display panel 100 has a uniform display effect.

It should be noted that the number of the plurality of color sub-pixels of each strip-shaped display structure, the plurality of color sub-pixels of the first sub-display panel, and the plurality of color sub-pixels of the second sub-display panel in the display panel are not limited to three, and the plurality of color sub-pixels are not limited to emitting red light, green light, and blue light. In other cases, the plurality of color sub-pixels of the strip-shaped display structure, the plurality of color sub-pixels of the first sub-display panel, and the plurality of color sub-pixels of the second sub-display panel also follow the above-mentioned arrangement rule.

For example, in conjunction with FIGS. 5 and 8A-8B, the arrays formed by the main pixels of the plurality of sub-display panels 41/42/43/44 are the same as each other, and the number, colors, and arrangement direction of the plurality of color sub-pixels of each main pixel are the same. In the display panel 100, the arrangement direction of the plurality of color sub-pixels 101/102/103 of each pixel 1 of the first strip-shaped display structure 10 corresponding to the first gap 104 is same as the arrangement direction of the plurality of color sub-pixels 101/102/103 of each pixel 1 of the second strip-shaped display structure 10' corresponding to the second gap 105, which simplifies the structure of the display panel, and is beneficial to make the display effect at the boundary of the first sub-display panel 41 and the second strip-shaped display structure 10' and at the boundary of the third sub-display panel 43 and the second strip-shaped display structure 10' have a high degree of consistency with the display effect of the first sub-display panel 41 and the third sub-display panel 43.

Similarly, as shown in FIG. 8B, the third sub-display panel 43 includes a plurality of third main pixels arranged in an array, and each third main pixel unit includes a plurality of color sub-pixels 431/432/433. The number and colors of the plurality of color sub-pixels 101/102/103 of each pixel 1 of the strip-shaped display structure 10', the number and colors of the plurality of color sub-pixels 431/432/433 of each third main pixel, and the number and colors of the plurality of color sub-pixels 411/412/413 of each first main pixel are respectively the same, in addition, the arrangement direction and arrangement order of the plurality of color sub-pixels 101/102/103 of each pixel of the second strip-shaped display structure 10', the arrangement direction and arrangement order of the plurality of color sub-pixels 431/432/433 of each third main pixel, and the arrangement direction and arrangement order of the plurality of color sub-pixels 411/412/413 of each first main pixel are respectively the same, so that the display effect at the boundary of the first sub-display panel 41 and the second strip-shaped display structure 10' and the display effect at the boundary of the third sub-display panel 43 and the second strip-shaped display structure 10' have a high degree of consistency with the display effect of the first sub-display panel 41 and the third sub-display panel 43, and the entire display panel 100 has a uniform display effect.

In FIGS. 8A-8B, the size of one color sub-pixel 101/102/103 in the first direction, the sum of the sizes in the first direction of two consecutive color sub-pixels of the color sub-pixels 411/412/413, and the sum of the sizes of the two consecutive color sub-pixels 421/422/423 in the first direction are substantially the same; in this case, for example, the light emitting device is a mini-LED.

Figure 9A:
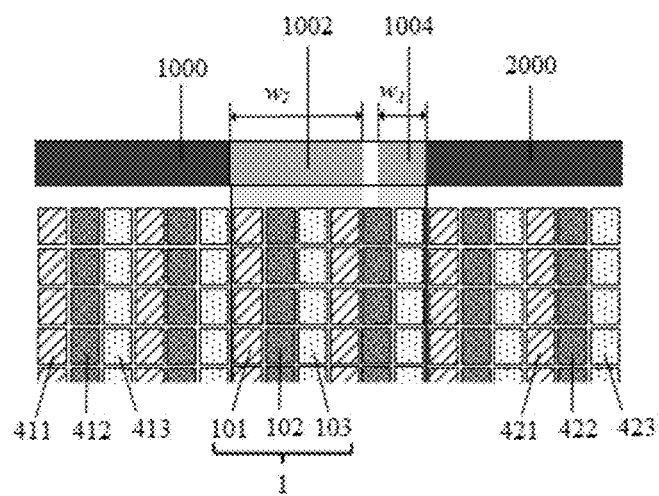
FIG. 9A is another enlarged diagram of a partial region $D_1$ in FIG. 5.
Figure 9B:
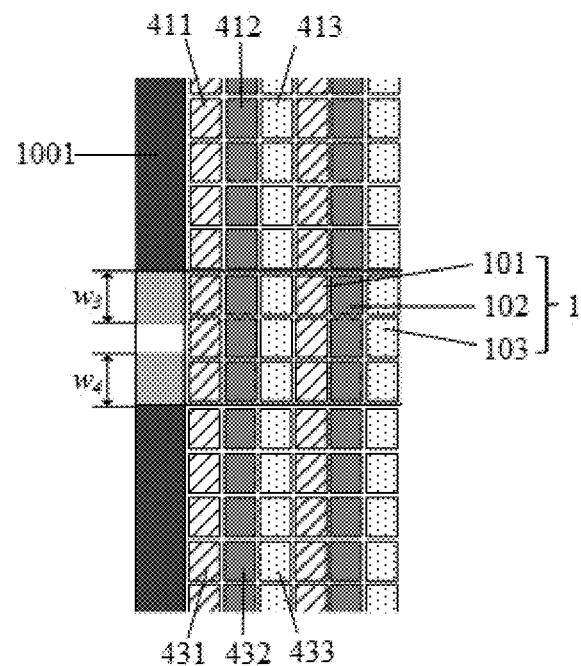
FIG. 9B is another enlarged diagram of a partial region $D_2$ in FIG. 5.

FIG. 9A is another enlarged diagram of a partial region $D_1$ in FIG. 5; and FIG. 9B is another enlarged diagram of a partial region $D_2$ in FIG. 5. The difference between the embodiment shown in FIGS. 9A-9B and the embodiment shown in FIGS. 8A-8B is that the size of one of the color sub-pixels 101/102/103, the size of one of the color sub-pixels 411/412/413, and the size of one of the color sub-pixels 421/422/423 are substantially the same, for example, the shape and size are substantially the same; in this case, for example, the light emitting device is a micro-LED. The shape and size of one color sub-pixel of the strip-shaped display structure which covers the gap and the shape and size of one color sub-pixel of the sub-display panels located on both sides of the gap are substantially the same, so that the display effect near the gap can have a higher consistency with the display effect of the sub-display panels located on both sides of the gap, and a better display effect is achieved.

As shown in FIG. 6, each of the plurality of sub-display panels 41/42/43/44 includes a first substrate 401 and a second substrate 402 that are opposite to each other, and the first substrate 401 is located on the display side of the corresponding sub-display panel. Each of the sub display panels 41/42/43/44 includes a side surface intersecting the surface of the display side of the respective sub display panel and a back surface opposite to the surface of the display side. At least a part of the extension part 12 is attached to the side surface of the respective sub display panel to further fix the first strip-shaped display structure 10. For example, a part of the extension part 12 close to the display part of the first strip-shaped display structure 10 is attached to the side surface of the respective sub display panel. The display panel 100 further includes a display signal input circuit. The display signal input circuit is located on a side of the second substrate 402 away from the first substrate 401 and is configured to provide a display signal. The connection signal line is electrically connected to the display signal input circuit. For example, as shown in FIG. 6 and FIG. 7B, the display panel 100 further includes a second circuit board 8 and a connection member 9. The second circuit board 8 is located on the back surface of the sub-display panel to which the extension part 12 is attached, such as the first sub-display panel 41, the display signal input circuit is located in the second circuit board 8; the connection component 9 is located on the second circuit board 8, and is electrically connected to the display signal input circuit; the flexible pin part 13 is connected to the connection member 9, so as to realize the electrical connection between the flexible pin part 13 and the display signal input circuit.

For example, each sub-display panel 41/42/43/44 is a liquid crystal display panel, the first substrate 401 is a color filter substrate, and the second substrate 402 is an array substrate, which is provided with a pixel circuit. For example, the pixel circuit includes a thin film transistor, a pixel electrode and a common electrode for forming a horizontal electric field that deflect liquid crystals; or, the liquid crystal display panel may also be TN type, one of the pixel electrode and the common electrode is located on the color filter substrate, and the other is located on the array substrate. The color filter, liquid crystal and the pixel circuit are represented by the reference number 403 in FIG. 6. For details of the liquid crystal display panel, reference may be made to conventional designs in this field. For example, as shown in FIG. 6, the liquid crystal display panel further includes a backlight plate 7 located on the side of the array substrate 402 away from the color filter substrate 401, the backlight plate 7 is configured to provide a light source for display. The display signal input circuit is located on the side of the backlight plate 7 away from the array substrate 402, and the flexible pin part 13 is bent to wrap a part of the edge of the backlight plate 7, so as to be electrically connected to the display signal input circuit across the edge of the backlight plate 7.

For example, as shown in FIG. 6, the display panel 100 further includes a diffuser 6. The diffuser 6 is located on the light exit side of the backlight plate 7 to diffuse the light from the backlight plate 7, so that the light incident on the color sub-pixels of the entire display panel 100 is more evenly. For example, the display panel 100 further includes a brightness enhancement film 5 stacked with the diffuser 6, for example, the brightness enhancement film 5 is located on the side of the diffuser 6 away from the backlight plate 7 to increase display brightness. The specific types and structures of the diffuser 6 and the brightness enhancement film 5 can refer to conventional techniques in the art.

For example, the size of the display panel 100 is 110 inches, for example, it is formed by splicing four 55-inch sub-display panels 41/42/43/44. Of course, the size of the display panel 100 is not limited to 110 inches, for example, it may be larger than 110 inches to realize an ultra-large display panel for making an ultra-large screen. In the large-size display panel provided by the embodiments of the present disclosure, the problem of poor display near the gap between adjacent sub-display panels is relieved or eliminated.

For example, the input signal from the control center (such as CPU, etc.) that controls the display image is divided by the FPGA method into a first display signal input to the plurality of sub-display panels and a second display signal input to the strip-shaped display structure; the first display signal is used to control the display of the plurality of sub-display panels, and the second display signal is used to control the display of the strip-shaped display structure.

For example, at least one embodiment of the present disclosure further provides a display apparatus, the display apparatus includes any display panel provided by the embodiments of the present disclosure.

Figure 10:
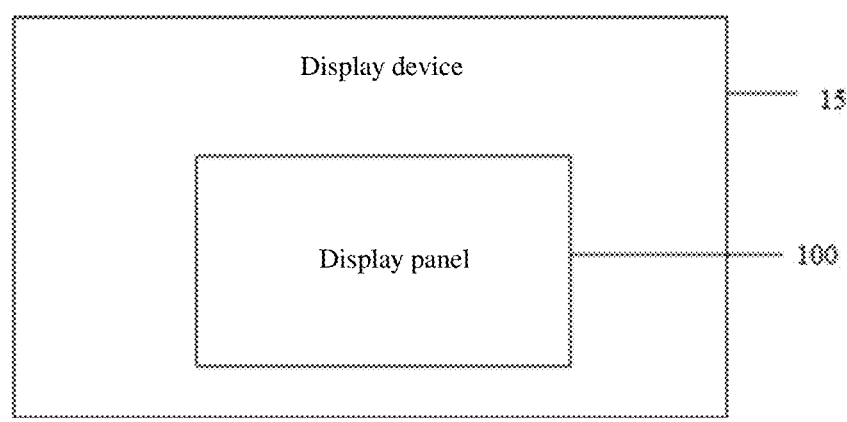
FIG. 10 is a schematic diagram of a display apparatus provided by an embodiment of the present disclosure.

FIG. 10 is a schematic diagram of a display apparatus provided by an embodiment of the present disclosure. As shown in FIG. 10, the display apparatus 15 provided by at least one embodiment of the present disclosure includes any display panel 100 provided by the embodiments of the present disclosure. For example, the display apparatus 15 may be a display module, for example including the above-mentioned display panel, or including the above-mentioned display panel and backlight, or may also be a display apparatus with other structures, such as the above-mentioned mobile phone, tablet computer, monitor, and notebook computer, ATM machine and other products. Other structures of the display apparatus 15 can be designed according to specific needs using conventional techniques in the art.

The above descriptions are only specific embodiments of the present disclosure, but the protection scope of the present disclosure is not limited thereto, the protection scope of the present disclosure should be determined by the protection scope of the claims.

What is claimed is:

1. A strip-shaped display structure, comprising a strip-shaped main body part and an extension part, wherein the strip-shaped main body part comprises:

a strip-shaped display part extending along a first direction, wherein the strip-shaped display part comprises a plurality of pixels arranged in an array, each of the pixels comprises a plurality of color sub-pixels, and each of the color sub-pixels comprises a light emitting device; and a driver circuit electrically connected to the light emitting device, wherein the strip-shaped main body has a first end part and a second end part that are opposite to each other in a second direction perpendicular to the first direction, the strip-shaped display part is at the first end part of the strip-shaped main body part, and the extension part is connected to the second end part of the strip-shaped main body part and is configured to be bendable from the second end part of the strip-shaped main body part along a bend axis parallel to the first direction to be away from a light exit side of the light emitting device; and the extension part comprises a connection signal line, and the connection signal line is connected to the driver circuit to provide a display signal to the driver circuit;

the strip-shaped main body part comprises a fold part connected with the strip-shaped display part, the fold part is bent along a bend axis parallel to the first direction to a side of the strip-shaped display part away from the light exit side of the light emitting device, and is stacked with the strip-shaped display part, and an end of the fold part opposite to an end connected to the strip-shaped display part is configured as the second end part of the strip-shaped main body part;

wherein the fold part includes a plurality of sub-fold parts, the plurality of sub-fold parts are bent along a bend axis parallel to the first direction to a side of the strip-shaped display part away from the light exit side of the light emitting device and are stacked with the strip-shaped display part.

2. The strip-shaped display structure according to claim 1, wherein the strip-shaped main body part is a flat plate as a whole;

a width of the strip-shaped display part in the second direction is smaller than a width of an entirety of the strip-shaped main body part in the second direction;

the strip-shaped main body part includes a foldable part extending along the first direction, the foldable part connects the strip-shaped display part and the extension part, and is configured to be bendable from a boundary of the foldable part and the strip-shaped display part along a bend axis parallel to the first direction to a light exit side of the strip-shaped display part away from the light emitting device, so as to be stacked with the strip-shaped display part.

3. The strip-shaped display structure according to claim 1, wherein the strip-shaped display part is stacked with the driver circuit, and the driver circuit is on a side of the strip-shaped display part away from the light exit side of the light emitting device.

4. The strip-shaped display structure according to claim 1, further including:

a first reinforcement plate which is between the strip-shaped display part and the fold part, and is stacked with the strip-shaped display part and the fold part.

5. The strip-shaped display structure according to claim 1, wherein an orthographic projection of the second end part of the strip-shaped main body part, on a plane where the strip-shaped display part is located, is within the strip-shaped display part.

6. The strip-shaped display structure according to claim 1, further including:

a second reinforcement plate which is between adjacent sub-fold parts of the plurality of sub-fold parts, and is stacked with the strip-shaped display part and the plurality of sub-fold parts.

7. The strip-shaped display structure according to claim 1, wherein light emitting devices in the plurality of color sub-pixels in each of the plurality of pixels is taken as an encapsulation unit, the encapsulation unit is encapsulated separately with an encapsulation film.

8. The strip-shaped display structure according to claim 1, wherein the extension part includes a plurality of the connection signal lines, each of the plurality of pixels includes a first electrode and a second electrode, and the first electrode and the second electrode are respectively connected to a cathode and an anode of the light emitting device of each of the color sub-pixels in the each of the plurality of pixels;

each of the plurality of pixels are in correspondence with two connection signal lines of the plurality of connection signal lines, and the two connection signal lines are respectively electrically connected to the first electrode and the second electrode in a pixel corresponding to the two connection signal lines.

9. The strip-shaped display structure according to claim 8, further including:

a flexible pin part which is at an end of the extension part, opposite to an end of the extension part connected to the strip-shaped main body part, and includes a plurality of pins, wherein the plurality of pins are electrically connected to the plurality of connection signal lines in one-to-one correspondence.

10. The display panel according to claim 1, wherein the bend axis along the first direction is a dividing line between the fold part and the strip-shaped main body part, and no light emitting device is arranged on the fold part in a case where the main body part is in an unfolded state; and in a case where the main body part is in a bent state, the fold part is bent to a side of the strip-shaped display part away from a light emitting side of the light emitting device along the bend axis parallel to the first direction and stacked with the strip-shaped display part.

11. A strip-shaped display structure, comprising a strip-shaped main body part and an extension part, wherein the strip-shaped main body part comprises:

a strip-shaped display part extending along a first direction, wherein the strip-shaped display part comprises a plurality of pixels arranged in an array, each of the pixels comprises a plurality of color sub-pixels, and each of the color sub-pixels comprises a light emitting device; and a driver circuit electrically connected to the light emitting device, wherein the strip-shaped main body has a first end part and a second end part that are opposite to each other in a second direction perpendicular to the first direction, the strip-shaped display part is at the first end part of the strip-shaped main body part, and the extension part is connected to the second end part of the strip-shaped main body part and is configured to be bendable from the second end part of the strip-shaped main body part along a bend axis parallel to the first direction to be away from a light exit side of the light emitting device;

the extension part comprises a connection signal line, and the connection signal line is connected to the driver circuit to provide a display signal to the driver circuit; and the strip-shaped display structure comprises a plurality of the extension parts, wherein the plurality of extension parts are arranged at intervals in the first direction, and each of the extension parts includes the connection signal line.

12. A display panel, comprising:
a plurality of sub-display panels and a strip-shaped display structure, wherein the strip-shaped display structure comprises a strip-shaped main body part and an extension part, wherein the strip-shaped main body part comprises:
a strip-shaped display part extending along a first direction, wherein the strip-shaped display part comprises a plurality of pixels arranged in an array, each of the pixels comprises a plurality of color sub-pixels, and each of the color sub-pixels comprises a light emitting device; and
a driver circuit electrically connected to the light emitting device,
wherein the strip-shaped main body has a first end part and a second end part that are opposite to each other in a second direction perpendicular to the first direction, the strip-shaped display part is at the first end part of the strip-shaped main body part, and the extension part is connected to the second end part of the strip-shaped main body part and is configured to be bendable from the second end part of the strip-shaped main body part along a bend axis parallel to the first direction to be away from a light exit side of the light emitting device;
the extension part comprises a connection signal line, and the connection signal line is connected to the driver circuit to provide a display signal to the driver circuit;
each of the plurality of sub-display panels comprises a plurality of main pixels arranged in an array, and each of the main pixels comprises a plurality of color sub-pixels;
the plurality of sub-display panels are spliced with each other, and a gap is between adjacent sub-display panels, the gap extends along the first direction, the strip-shaped main body part is stacked on a display side of the sub-display panel, and the strip-shaped display part covers the gap, the light emitting device is on a side of the strip-shaped main body part away from the sub-display panel, and the extension part is bent from the second end part of the strip-shaped main body part along a bend axis parallel to the first direction into the gap;
two adjacent sub-display panels of the plurality of sub-display panels are respectively a first sub-display panel and a second sub-display panel;
the first sub-display panel comprises a first display region and a first non-display region outside the first display region, and the second sub-display panel comprises a second display region and a second non-display region outside the second display region, the first non-display region and the second non-display region are respectively on two sides of the gap;
the strip-shaped display part covers the first non-display region and the second non-display region;
the first sub-display panel comprises a plurality of first main pixels arranged in an array, and each of the first main pixels comprises a plurality of color sub-pixels;
the second sub-display panel comprises a plurality of second main pixels arranged in an array, and each of the second main pixel units comprises a plurality of color sub-pixels;
a total number and colors of the plurality of color sub-pixels of each of the pixels of the strip-shaped display structure, a total number and colors of the plurality of color sub-pixels of each of the first main pixels, and a total number and colors of the plurality of color sub-pixels of each of the second main pixel are same, and an arrangement direction and an arrangement order of the plurality of color sub-pixels of each of the pixels of the display structure, an arrangement direction and an arrangement order of the plurality of color sub-pixels of each of the first main pixels, and an arrangement direction and an arrangement order of the plurality of color sub-pixels of each of the second main pixels are same.

13. The display panel according to claim 12, wherein the strip-shaped main body part includes a first edge extending along the first direction and a second edge extending along the first direction, the first edge is opposite to the second edge; the first edge is aligned with an edge of the first display region, and the second edge is aligned with an edge of the second display region.

14. The display panel according to claim 12, wherein the arrays of the main pixels of the plurality of sub-display panels are same, and a total number of the plurality of color sub-pixels of each of the main pixels is same, colors of the plurality of color sub-pixels of each of the main pixels is same, and an arrangement direction of the plurality of color sub-pixels of each of the main pixels is same;
the gap includes a first gap and a second gap, an extension direction of the first gap is perpendicular to an extension direction of the second gap, and the strip-shaped display structure is respectively provided corresponding to the first gap and the second gap;
in the display panel, an arrangement direction of the plurality of color sub-pixels of each of the pixels of the strip-shaped display structure corresponding to the first gap is same as an arrangement direction of the plurality of color sub-pixels of each of the pixels of the strip-shaped display structure corresponding to the second gap.

15. The display panel according to claim 12, wherein a plurality of the strip-shaped display structures are provided corresponding to one of the gap(s), and the plurality of strip-shaped display structures are arranged along the extension direction of the one of the gap(s), and no gap is between the strip-shaped main body parts of adjacent strip-shaped display structures.

16. The display panel according to claim 12, wherein the main body part is fixed to the sub-display panel by an adhesive glue, the strip-shaped main body part is in direct contact with the adhesive glue, and the adhesive glue is in direct contact with the sub-display panel.

17. The display panel according to claim 16, wherein in a case where the strip-shaped display structure includes a fold part and a first reinforcement plate and the display panel includes the adhesive glue, the first reinforcement plate includes a part that does not overlap with the fold part;
the adhesive glue includes:
a first adhesive glue, wherein the first adhesive glue is between the part of the first reinforcement plate that does not overlap with the fold part and the sub-display panel, and the first adhesive glue is configured to fix the part of the first reinforcement plate that does not overlap with the fold part to the sub-display panel; and
a second adhesive glue which is between the fold part and the sub-display panel and is configured to fix the fold part on the sub-display panel, wherein
a thickness of the second adhesive glue in a direction perpendicular to a surface of a display side of the sub-display panel is greater than a thickness of the first adhesive glue in the direction perpendicular to the surface of the display side of the sub-display panel.

* * * * *